UNITED STATES PATENT OFFICE.

CHARLES OSWALD, HERMANN LORÉTAN, AND CHARLES DE LA HARPE, OF BASEL, SWITZERLAND, ASSIGNORS TO DYEWORKS FORMERLY L. DURAND HUGUENIN & CO., OF BASEL, SWITZERLAND.

YELLOW-GREEN DYE AND PROCESS OF MAKING SAME.

No. 807,181.  Specification of Letters Patent.  Patented Dec. 12, 1905.

Application filed September 12, 1905. Serial No. 278,086. (Specimens.)

*To all whom it may concern:*

Be it known that we, CHARLES OSWALD, HERMANN LORÉTAN, and CHARLES DE LA HARPE, citizens of the Swiss Republic, and residents of Basel, Switzerland, have invented new Yellowish-Green Dyestuffs and a Process for Manufacturing the Same, of which the following is a full, clear, and complete specification.

Formaldehyde reacts with dyestuffs of the gallocyanin series either singly in aqueous solution or in aqueous solution in presence of acids or alkalies. This reaction is facilitated by a rise of temperature or by the presence of acids. For example, the reaction occurs very rapidly and at ordinary temperature in presence of strong sulfuric acid. The proportions of formaldehyde employed may be varied. The products obtained are dyestuffs dyeing with chromium mordanted fibers yellowish green. Their solutions in concentrated sulfuric acid are green blue and turn to reddish by addition of water. Their solutions in acidulated water are rose-colored and turn to intense fuchsin red by addition of sodium nitrite. Their aqueous solutions give by addition of sodium acetate a green precipitate and by addition of alkalies a brownish precipitate. When these new yellowish-green dyestuffs are heated with water alone or with acidulated water either for a long time at 100° or for a shorter time at a higher temperature and under pressure or with aqueous solutions of certain salts—as calcium chlorid, zinc sulfate, ammonium hydrochlorid, anilin hydrochlorid—they are modified, become more easily soluble in water, and yield on with chromium mordanted fibers blue tints.

The invention is illustrated by the following examples:

Example I: Thirty-seven kilos of the gallocyanin dye obtained from nitrosodiethylanilin hydrochlorid and gallamic acid are incorporated with sixty liters of tepid water. Then one hundred and twenty kilos of hydrochloric acid of 21° Baumé are added, followed by ten kilos of formaldehyde of forty-per-cent. strength. The mixture is heated at 100° centigrade until the transformation is complete—say for about two to three hours. After the mixture has cooled somewhat one hundred kilos of caustic soda of 38° Baumé are added. The whole is allowed to cool completely, and the dyestuff is separated by filtration, pressed, and dried.

Example II: Thirty-seven kilos of the gallocyanin dyestuff employed in example I are dissolved in one hundred and fifty kilos of concentrated sulfuric acid, and to the solution while it is well stirred are added little by little eight kilos of formaldehyde of forty-per-cent. strength. After three hours the whole is poured on three hundred kilos of ice. Then successively are added two hundred kilos of caustic soda of 38° Baumé and sixty kilos of common salt. When the mixture is cold, the dyestuff is separated by filtration, washed with salt-water, pressed, and dried.

In the foregoing examples the gallocyanin dyestuff derived from diethylanilin and gallamic acid may be replaced by other gallocyanin dyestuffs.

What we claim is—

1. The process for the manufacture of new dyestuffs dyeing with chromium mordanted fibers yellowish green, by treating gallocyanin dyestuffs with formaldehyde, as described.

2. The process for the manufacture of new dyestuffs dyeing with chromium mordanted fibers yellowish green by treating with formaldehyde the gallocyanin dyestuff resulting from the reaction of a nitrosodialkylanilin hydrochlorid on gallamic acid, as described.

3. As a new article of manufacture, the dyestuff obtained by the action of formaldehyde on a gallocyanin dyestuff, which dyes with chromium mordanted fibers yellowish green, dissolves in acidulated water with a rose-colored coloration turning to intense fuchsin red by addition of a little sodium nitrite and dissolves in concentrated sulfuric acid with a blue-green coloration turning to reddish by addition of water, the said dyestuff being transformed into a blue coloring-matter by its heating with water or certain solutions of salts and its aqueous solutions giving by addition of sodium acetate a green precipitate and by addition of alkalies a brownish precipitate.

In witness whereof we have hereunto signed our names, this 31st day of August, 1905, in the presence of two subscribing witnesses.

CHARLES OSWALD.
HERMANN LORÉTAN.
CHARLES DE LA HARPE.

Witnesses:
GEO. GIFFORD,
AMAND RITTER.